United States Patent
Jin et al.

(10) Patent No.: US 6,825,595 B2
(45) Date of Patent: Nov. 30, 2004

(54) COMPOSITE FOR PASTE INCLUDING CARBON NANOTUBES, ELECTRON EMITTING DEVICE USING THE SAME, AND MANUFACTURING METHOD THEREOF

(75) Inventors: Yong-wan Jin, Seoul (KR); Jae-eun Jung, Seoul (KR)

(73) Assignee: Samsung SDI Co., Ltd., Suwon-Si (KR)

(*) Notice: Subject to any disclaimer, the term of this patent is extended or adjusted under 35 U.S.C. 154(b) by 78 days.

(21) Appl. No.: 10/302,899

(22) Filed: Nov. 25, 2002

(65) Prior Publication Data

US 2003/0141798 A1 Jul. 31, 2003

(30) Foreign Application Priority Data

Nov. 23, 2001 (KR) ......................................... 2001-73289
Nov. 16, 2002 (KR) ................................. 10-2002-0071399

(51) Int. Cl.[7] .......................... H01J 1/30; H01J 1/304; H01B 1/06
(52) U.S. Cl. ........................ 313/311; 252/506; 313/495
(58) Field of Search ............................... 313/311, 310, 313/495; 252/506, 510; 445/51

(56) References Cited

U.S. PATENT DOCUMENTS

| | | | |
|---|---|---|---|
| 3,947,608 A | * | 3/1976 | Duinker et al. ............... 427/64 |
| 6,232,706 B1 | | 5/2001 | Dai et al. |
| 6,239,547 B1 | | 5/2001 | Uemura et al. |
| 2002/0074932 A1 | * | 6/2002 | Bouchard et al. ........... 313/495 |
| 2003/0151344 A1 | * | 8/2003 | Cheng et al. ................ 313/311 |

FOREIGN PATENT DOCUMENTS

| KR | A-2001-0017543 | 3/2001 |
|---|---|---|
| WO | WO 01/99146 A2 | 12/2001 |

* cited by examiner

*Primary Examiner*—Vip Patel
*Assistant Examiner*—Glenn Zimmerman
(74) *Attorney, Agent, or Firm*—Burns, Doane, Swecker & Mathis, L.L.P.

(57) ABSTRACT

Provided are a composite for paste including carbon nanotubes (CNTs), an electron emitting device using the same, and a manufacturing method thereof. The provided composite for paste includes 5 to 40 parts by weight of CNTs, 5 to 50 parts by weight of alkali metal silicate, and 1 to 20 parts by weight of a binder. The provided electron emitting device includes electron emitting tips, which are located on cathode electrodes in wells and formed of the composite for paste including 5 to 40 parts by weight of CNTs, 5 to 50 parts by weight of alkali metal silicate, and 1 to 20 parts by weight of a binder. The electron emitting device has excellent stability and durability and uniformly emits electrons from a large area, thereby improving the overall performance of an apparatus using the electron emitting device.

29 Claims, 10 Drawing Sheets

COMPOSITE FOR PASTE INCLUDING CARBON NANOTUBES, ELECTRON EMITTING DEVICE USING THE SAME, AND MANUFACTURING METHOD THEREOF

BACKGROUND OF THE INVENTION

This application claims the priority of Korean Patent Applications No. 2001-73289, filed Nov. 23, 2001 and No. 2002-71399, filed Nov. 16, 2002 in the Korean Intellectual Property Office, which is incorporated herein in its entirety by reference.

1. Field of the Invention

The present invention relates to a composite for paste, an electron emitting device using the same, and a manufacturing method thereof used in a field emission display (FED), and more particularly, to a composite for paste using carbon nanotubes (CNT), an electron emitting device, and a manufacturing method thereof.

2. Description of the Related Art

Electron emitting devices are used as sources of electron emission in field emission displays, which are attracting attention as next generation flat display devices. FEDs have merits of a high picture quality, high efficiency, and low power consumption.

The performance of the FED depends on a processing technology and the stability of the electron emitting device.

In a conventional electron emitting device using a metal tip, polymers attached for sealing during the production of a vacuum tube having the electron emitting device are not completely burned. The polymers remain in the vacuum tube and are slowly emitted with the operation of the FED. Then, the polymers are adsorbed on the surface of the metal. Therefore, the number of electrons emitted from the metal tip is reduced, thereby degrading the overall performance of the FED. Moreover, the polymers oxidize the metal tip, thereby shortening the life of the metal tip.

To solve the above-described problems, attempts have been made to use carbon nanotubes (CNTs), which have a high electron emission rate and stability, for the electron emitting device.

In a CNT, carbon atoms form the structure of a honeycomb pattern and graphite surfaces rolled with a nano-size diameter. Due to the intrinsic physical, electrical, and chemical characteristics of CNTs, CNTs have recently been used in advanced technologies.

Methods for producing the electron emitting device using CNTs, in the display technique field include: plasma enhanced chemical vapor deposition (PECVD) disclosed in U.S. Pat. No. 6,232,706; a method in which a paste is used, disclosed in U.S. Pat. No. 6,239,547; and a method in which an electric swing method is used, disclosed in Korean Patent No. 2001-0017543.

In PECVD, acetylene gas is injected into a space between two electrodes in a reactor including a nickel catalyst, and glow discharges the gas by a direct current or a radio frequency field. Then, the gas is converted into plasma for growing CNTs on the electrodes by using the conversion energy.

In the method for producing an electron emitting device using paste, CNTs are converted into CNT powder using laser ablation or an arc discharge. Then, the CNT powder is mixed with conductive or non-conductive paste for printing.

In the method for producing an electron emitting device using the electric swing method, CNTs dispersed in an aqueous solution are grown on an electrode using the electric swing method.

Figure 1:
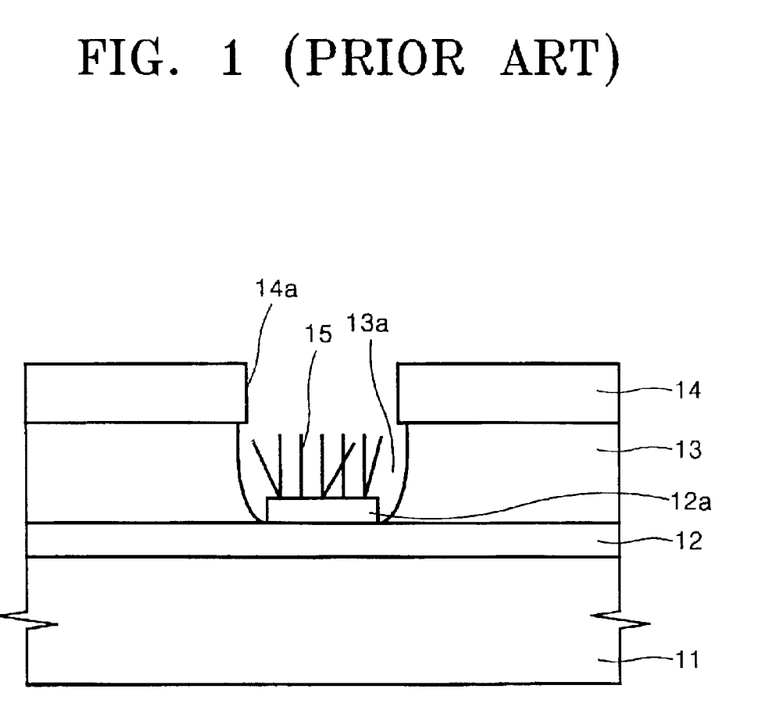
FIG. 1 is a sectional view showing a conventional electron emitting device using carbon nanotubes (CNTs)

FIG. 1 shows an electron emitting device using the electric swing method which is disclosed in Korean Patent No. 2001-17543. Referring to FIG. 1 a conventional electron emitting device comprises a cathode 12 formed on a substrate 11; a thin film 12a attached to the cathode 12, on which tips 15 formed of CNT powder are formed; a gate insulating layer 13 for surrounding the tips 15; and a gate electrode 14 on the gate insulating layer 13 and above the tips 15, the gate electrode having an opening 14a for emitting electrons.

The tips 15 of the electron emitting device are formed by the electric swing method. Here, the thin film 12a and an electrode plate are installed in a solution of CNT powder, then the cathode of an external power source is connected to the thin film 12a, and the anode of the external power source to the electrode plate. When voltage is applied to the cathode and the anode, particles of the CNT powder, which are charged positive, are attached to the thin film 12a which is charged by the cathode. Alternatively, the substrate 11 can be substituted for the thin film 12a, and the CNT can be grown directly on the substrate 11.

In the conventional PECVD, CNTs are vertically aligned on the substrate, however it is difficult to uniformly emit electrons from a large area. Additionally, CNTs are grown in a high temperature of over 500 to 600° C., thereby increasing the production cost, since a silicon or crystal glass substrate must be used instead of a glass substrate in order to increase the temperature of the substrate.

In the conventional method for producing the electron emitting device using the paste, the CNT powder is mixed with silver paste or a polymer compound, and a thermal process is performed at a high temperature of about 350 to 500° C. to oxidize the CNT and the metal. Therefore, the lives of the CNTs and the metal apparatus are shortened. Moreover, the thermal processing time in producing the electron emitting device is lengthened, and a large amount of residual gas is generated by residual polymers, thereby shortening the life of the electron emitting device.

SUMMARY OF THE INVENTION

Accordingly, to solve the above-described problems, it is an objective of the present invention to provide a composite for forming an electron emitting device for uniformly emitting electrons from a large area while having excellent stability and durability, and an electron emitting device using the composite and a manufacturing method thereof.

To accomplish the objective, the present invention provides a composite for paste including 5 to 40 parts by weight of carbon nanotubes (CNTs), 5 to 50 parts by weight of alkali metal silicate, and 1 to 20 parts by weight of binder.

It is preferable that the composite further includes 5 to 40 parts by weight of graphite.

The composite formed of CNTs and the alkali metal silicate, or the composite formed of CNTs, the alkali metal silicate, and the graphite preferably also includes 10 to 40 parts by weight of water.

It is preferable that the composite further includes an additive (1 to 6 parts by weight), so that the hydrogen-ion concentration (pH) of the composite is from 10 to 14. The additive is any one of potassium hydroxide, sodium hydroxide, or ammonium hydroxide aqueous solution.

The size of the CNTs is preferably from 10 nanometers to 10 micrometers.

It is preferable that the alkali metal silicate is $Na_2O$-$nSiO_2$ or $K_2O$-$nSiO_2$, and n is from 2.2 to 3.9.

The size of the graphite is preferably from 100 nanometers to 5 micrometers.

The binder may be any one material from an organic carboxylic acid group, an organic sulfonic acid group, an ester group, an inorganic acid group, a salt group thereof, a hydracid salt, and an organic acid compound group.

It is preferable that the binder is formed by mixing at least two materials from the organic carboxylic acid group, the organic sulfonic acid group, the ester group, the inorganic acid group, the hydracid salt, and the organic acid compound group.

To accomplish the above-described objective, the present invention provides an electron emitting device including a substrate, cathode electrodes patterned on the substrate in a predetermined shape, a resistive layer stacked to encompass the cathode electrodes, thereby exposing portions of the cathode electrodes, a gate insulating layer patterned on the resistive layer in a predetermined shape to arrange wells in which the exposed cathode electrodes are located, and gate electrodes arranged on the gate insulating layer, the electron emitting device comprising electron emitting tips formed of a composite for paste including 5 to 40 parts by weight of CNTs, 5 to 50 parts by weight of alkali metal silicate, and 1 to 20 parts by weight of binder.

To accomplish the above-described objective, the present invention provides first step of forming cathode electrodes on a substrate and patterning the cathode electrodes in a predetermined shape, second step of sequentially depositing and patterning a resistive layer, an insulating layer, and gate electrodes on the cathode electrodes to form wells, which exposes portions of the cathode electrodes, third step of forming a photoresist on the sidewalls of the resistive layer, the insulating layer, and the gate electrodes, and on the gate electrodes, fourth step of printing a composite for paste including 5 to 40 parts by weight of CNTs, 5 to 50 parts by weight of alkali metal silicate, and 1 to 20 parts by weight of binder in order to coat the cathode electrodes exposed through the wells and the photoresist, and fifth step of removing the photoresist to remain the composite for paste on the cathode electrodes so as to form electron emitting tips.

It is preferable that fourth step further includes drying the composite for paste at a temperature over 50° C. after printing the composite for paste.

The composite for paste includes 5 to 40 parts by weight of CNTs, 5 to 50 parts by weight of the alkali metal silicate, and 1 to 20 parts by weight of a binder.

It is preferable that the composite for paste further includes 5 to 40 parts by weight of graphite.

It is preferable that the composite for paste further includes 10 to 40 parts by weight of water.

It is preferable that the composite for paste further includes 1 to 6 parts by weight of additive to control the pH of the composite to be from 10 to 14.

Here, the additive is any one of potassium hydroxide, sodium hydroxide, or ammonium hydroxide aqueous solution.

It is preferable that the size of the CNT is from 10 nanometers to 10 micrometers, and the alkali metal silicate is $Na_2O$-$nSiO_2$ or $K_2O$-$nSiO_2$, wherein n is from 2.2 to 3.9.

It is still preferable that the size of the graphite is from 100 nanometers to 5 micrometers.

The binder may be any one material from an organic carboxylic acid group, an organic sulfonic acid group, an ester group, an inorganic acid group, a salt group thereof, a hydracid salt, and an organic acid compound group.

It is preferable that the binder is formed by mixing at least two materials from the organic carboxylic acid group, the organic sulfonic acid group, the ester group, the inorganic acid group, the salt group thereof, and the organic acid compound group.

The cathode electrode is formed of a conductive transparent material, preferably an indium-tin-oxide layer.

The resistive layer is amorphous silicon.

The gate insulating layer is formed of silicon dioxide, and the gate electrode is formed of chrome.

The present invention uses an electrode as an electron emitting device, which is formed by performing a photo lithography process on CNTs, or a CNT and alkali metal silicate formed by mixing CNTs and graphite with the alkali metal silicate, or the composite using CNTs, graphite, and the alkali metal silicate. Here, the CNT is operated at a lower voltage than a conventional field emission display (FED), and has a structure similar to $C_{60}$, which allows the CNT to have excellent durability and electrical conductivity.

The electron emitting device produced by the composite provides a uniform electron emitting characteristic from a large area, and provides improved life and stability.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE INVENTION

A preferred embodiment of a composite for paste, an electron emitting device using the same, and a manufacturing method thereof according to the present invention will now be described with reference to the accompanying drawings. In the drawings, the same reference numerals in different drawings represent the same element.

Figure 2:
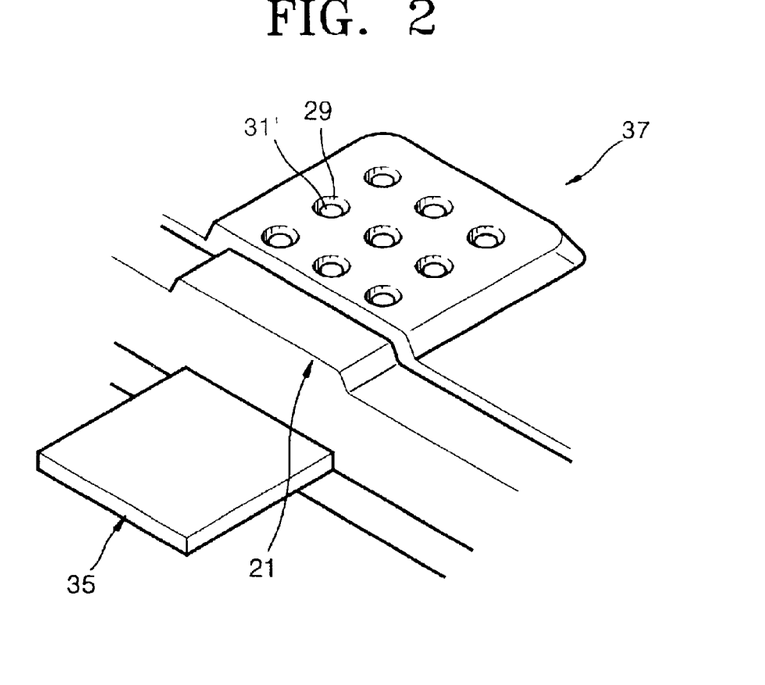
FIG. 2 is a perspective view showing a portion of an electron gun using an electron emitting device according to an embodiment of the present invention.

FIG. 2 illustrates an electron gun, which uses electron emitting devices according to an embodiment of the present invention. Referring to FIG. 2, the electron gun 37 includes nine electron emitting tips 31' in one pixel, and a cathode electrode plate 35 arranged underneath a substrate 21 on which the electron emitting tips 31' are located. Here, the cathode electrode plate 35 is parallel with the substrate 21.

Figure 3:
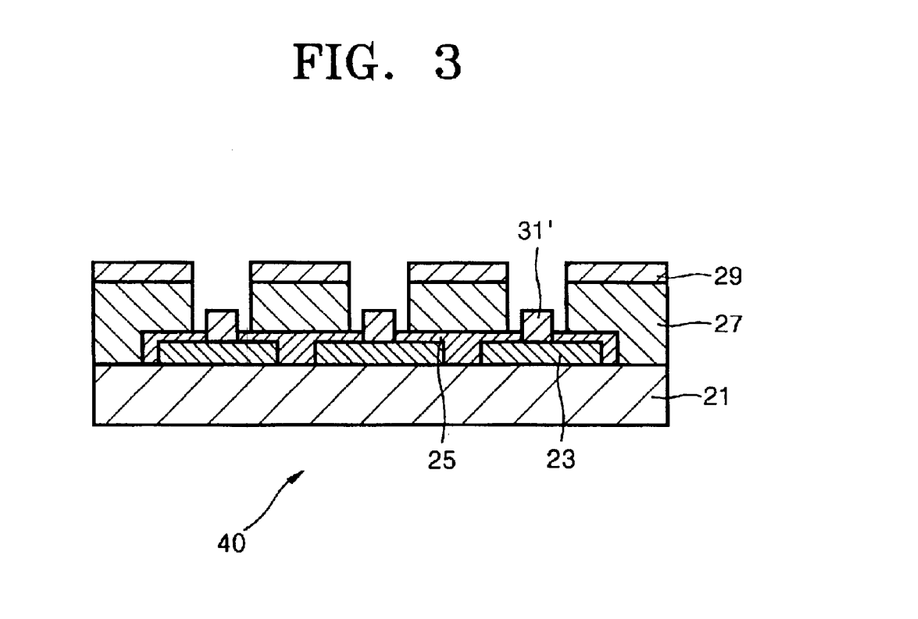
FIG. 3 is a sectional view showing the electron emitting device according to the embodiment of the present invention.

FIG. 3 is a sectional view of the electron emitting devices 30 of FIG. 2.

Referring to FIG. 3, the electron emitting device includes: a substrate 21; cathode electrodes 23 stacked on the substrate 21 in one row; a resistive layer 25 for encompassing the cathode electrodes 23, thereby exposing the cathode electrodes 23; electron emitting tips 31' formed of a composite for paste including electron emitting cathode nanotubes (CNTs) and alkali metal silicate, located on the cathode electrodes 23 on the substrate 21; gate insulating layers 27 formed around the electron emitting tips 31' for arranging wells 27a in which the electron emitting tips 31' are located; and gate electrodes 29 arranged on the gate insulating layers 27.

The cathode electrode 23 is an indium-tin-oxide ($In_2O_3 \cdot SnO_2$) layer, which is formed of a conductive transparent material, and is connected with the cathode electrode plate 35 of FIG. 2. The resistive layer 25 is formed of amorphous silicon for adjusting the resistance of the indium-tin-oxide layer.

The cathode electrode 23 has to be electrically conductive and transparent for a rear exposure process, which is required in a photo process of the production process. In order to uniformly emit electrons from each hole of the electron emitting devices 30 formed on the cathode electrodes 23, the resistive layer 25, for example, the amorphous silicon, is formed as shown, thereby improving the performance of the electron emitting device 30.

The gate insulating layer 27 is formed of silicon dioxide ($SiO_2$), and the gate electrode 29 is formed of chrome (Cr).

In the electron emitting device according to the present invention, electrons are input from the cathode electrodes 23 to the electron emitting tips 31' and the electrons are emitted from CNTs included in the composite 31 for paste. The composite 31 for paste used in the present invention is a composite formed of CNTs, the alkali metal silicate, and the binder, or a composite formed of CNTs, graphite, the alkali metal silicate, and the binder.

It is preferable that the CNTs for the composite 31 for paste are selected from uniform-sized mono- or multi-layered CNTs, regardless of thickness, kind, and length of the CNTs. CNTs having a size of 10 nanometers to 10 micrometers are most preferable for forming the composite of CNTs and alkali metal silicate.

To adjust the length of CNTs, the CNTs are reacted and cut to a small size by using strong acid ($HNO_3:H_2SO_4=3:1$). Then, a field flux flow separating method is used to extract CNTs having sizes under 5 microns, more preferably under 1 micron. Alternatively, the CNTs are dispersed in alcohol and processed in a sonifier for 10 to 30 minutes, thereby being cut to a small size. The field flux flow separating method is based on the principle of differing flow rates of a fluid according to the amount friction between a tube and the fluid. Therefore, the CNTs dispersed in the fluid are separated by size according to the flow rate of the fluid.

Graphite having a particle size less than 100 nanometers to 5 micrometers is used. The composite becomes conductive due to the graphite, which operates as the binder.

The alkali metal silicate is $Na_2O\text{-}nSiO_2$ or $K_2O\text{-}nSiO_2$, wherein n is from 2.2 to 3.9 while not considering n.

The binder uses at least one material from an organic carboxylic acid group including formic acid, acetic acid, and propionic acid; an organic sulfonic acid group including benzene sulfonic acid and toluene sulfonic acid; an ester group including methyl formic acid and ethyl acetic acid; an inorganic acid group including hydrochloric acid, sulfonic acid, nitric acid, boric acid, chloric acid, metaphosphoric acid, pyrophosphoric acid, polyphosphoric acid, hypophosphoric acid, phosphorous acid, perphosphoric acid, potassium hypophosphoric acid, and potassium phosphorous acid; an inorganic salt group thereof; a hydracid salt including potassium hydrosulfate and sodium bicarbonate; and an organic acid composition group including aluminum phosphate and oxycarboxylic acidic aluminum salt. Each material or a mixture of at least two materials is used for the binder.

In the case of producing a composite including CNTs and the alkali metal silicate, or a composite including CNTs, graphite, and the alkali metal silicate, the mixing rate is described as follows. The CNTs (5 to 40 parts by weight), the graphite (5 to 40 parts by weight), or the graphite and CNTs (5 to 40 parts by weight) is mixed with the alkali metal silicate (5 to 50 parts by weight) and water (10 to 50 parts by weight). The binder (1 to 20 parts by weight) is added, thereby producing the composite 31 for paste.

In the composite 31 for paste, the alkali metal silicate and the binder are hardened at a temperature over 50° C. by being converted from a sol state into a gel state for combining the CNT, or the CNT and graphite on the indium-tin-oxide layer 23. To control the dispersion of the composite 31 for paste, a potassium hydroxide (KaOH), sodium hydroxide (NaOH), or ammonium hydroxide (NH4OH) aqueous solution is added (1 to 3%), thereby adjusting the hydrogen-ion concentration (pH) to be from 10 to 14.

FIGS. 4A through 4K are vertical sectional views of the production steps of a composite for paste and an electron emitting device using the same according to an embodiment of the present invention.

Figure 4A:
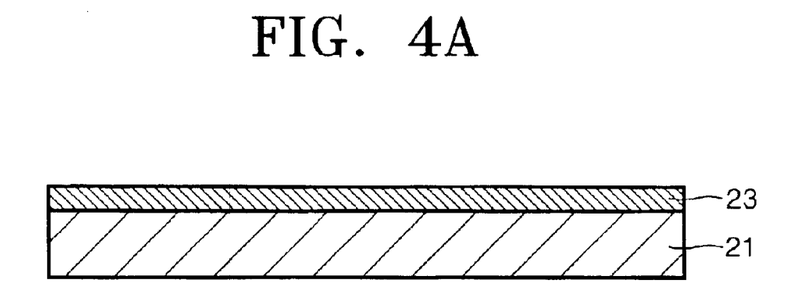
FIGS. 4A through 4K illustrate a method for producing the electron emitting device according to the present invention.

As shown in FIG. 4A, to produce the electron emitting device according to the embodiment of the present invention, a cathode electrode 23 formed of an indium-tin-oxide layer is stacked on a glass substrate 21.

Figure 4B:
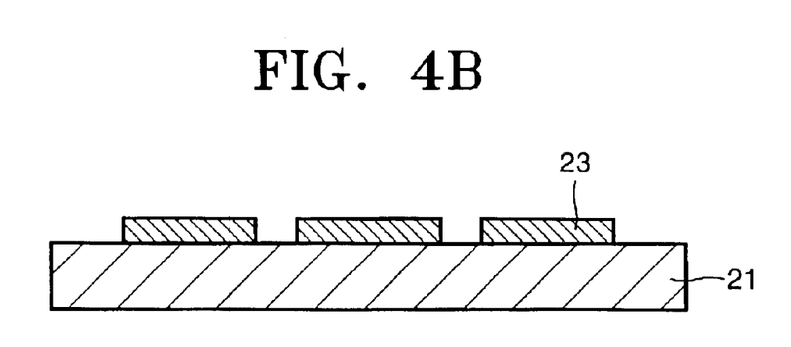

Next, the cathode electrode 23 as an indium-tin-oxide layer is spread and patterned on the glass substrate 21, as shown in FIG. 4B. Here, the patterning is performed by a photo process.

The photo process is formed by performing the steps of: coating a photoresist on the cathode electrode 23; locating a mask which has the shape to be patterned, on the cathode electrode 23 for performing a rear exposure; removing the photoresist portions which are exposed by a developer solution; removing the portions of the cathode electrode 23 whose photoresist is removed, by an etching process; and removing and cleaning the remaining photoresist.

Figure 4C:
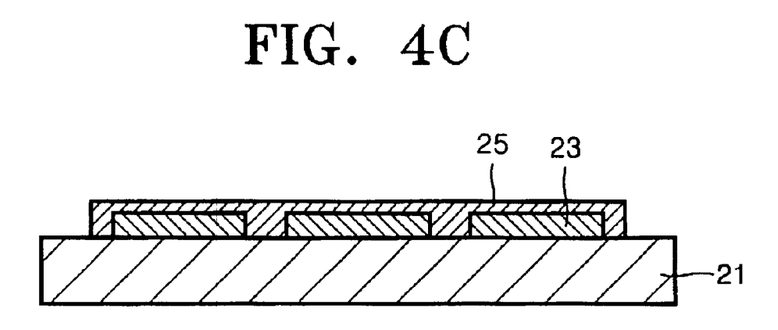

After patterning the cathode electrode 23, a resistive layer 25 formed of amorphous silicon is stacked so as to surround the cathode electrode 23 as shown in FIG. 4C.

Figure 4D:
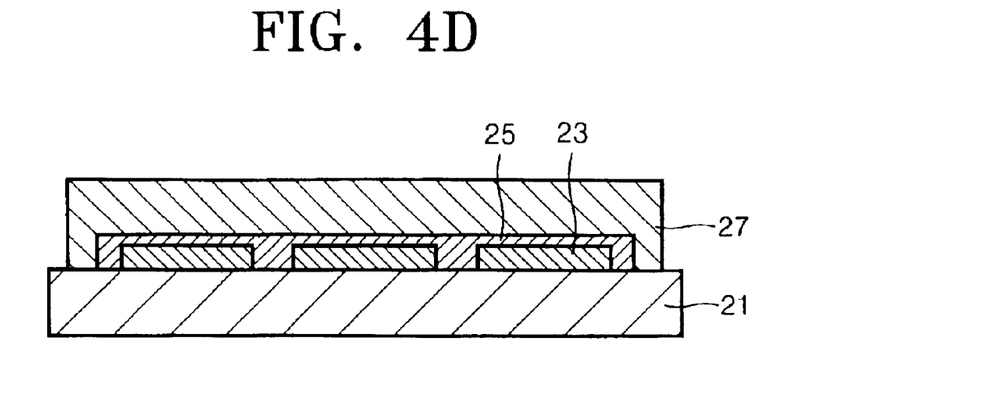
Figure 4E:
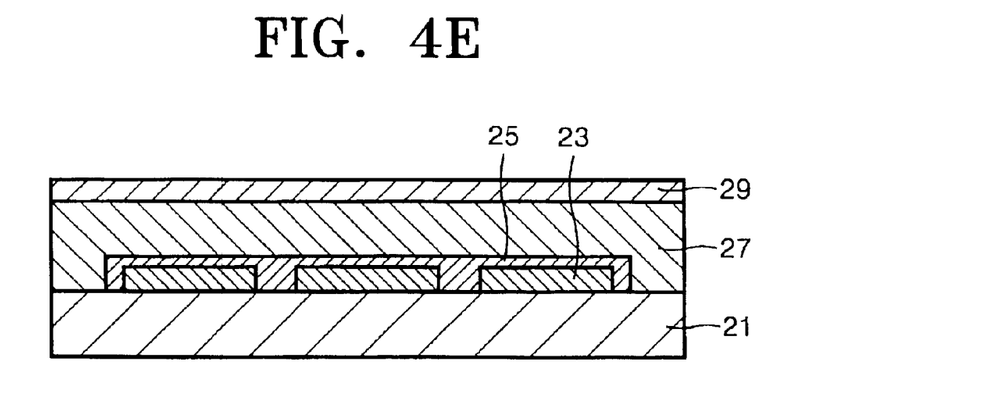

Then, a gate insulating layer 27 formed of silicon dioxide ($SiO_2$) for forming an insulating layer is stacked on the cathode electrode 23 and the resistive layer 25 as shown in FIG. 4D. Then, chrome for forming gate electrodes 29 is successively formed as a thin film as shown in FIG. 4E.

Figure 4F:
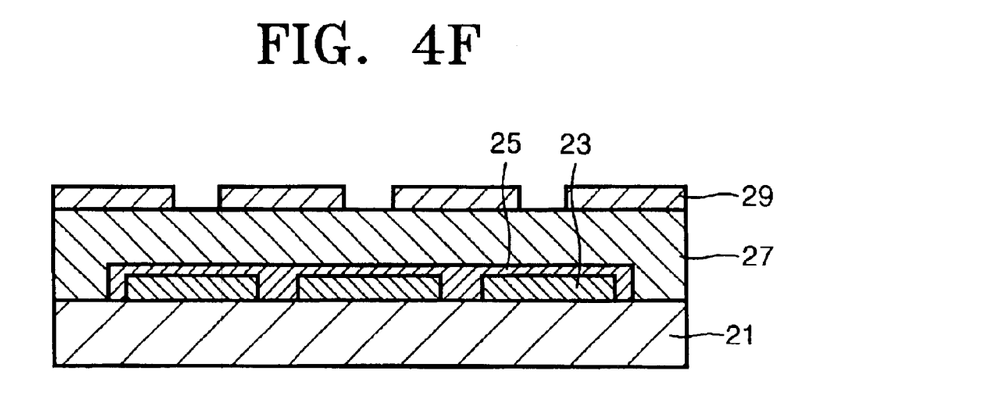

FIG. 4F illustrates the step of removing the gate electrodes 29 by using the photo process, which is shown in FIG. 4B. The spreading, exposing, and developing steps of the photoresist are the same as shown in FIG. 4B. However, a dry etching process is performed in FIG. 4F.

Figure 4G:
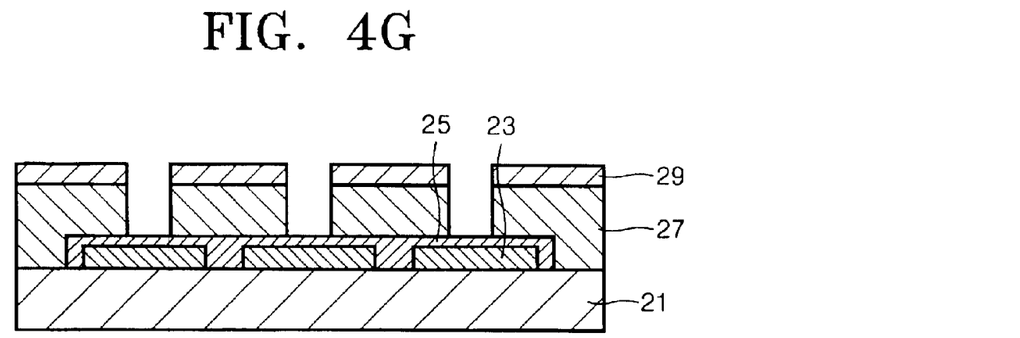

FIG. 4G illustrates the step of removing the gate insulating layer 27 by the photo process shown in FIG. 4B. The processes in the photo process are the same as those shown in FIG. 4B, however a wet etching process is performed in FIG. 4G. In the wet etching process, chemicals in a solution are chemically reacted with an object to be etched for separating the material generated by the reaction from the object to be etched.

Silicon dioxide has the structure of oxygen atoms surrounding silicon atoms in a tetrahedron shape. A buffer HF solution including fluorine is generally used for etching the silicon dioxide. Here, the ionic radius of the fluorine is smaller than that of oxygen, and the fluorine forms Si—F (1.40 Å) bonds, which are smaller than Si—O (1.62 Å) bonds. In addition, the binding energy of the Si—F bonds is the half of the binding energy of the Si—O bonds. Therefore, the fluorine is substituted for the oxygen in the silicon dioxide for binding with the silicon. Based on the described principle, the silicon dioxide is etched.

Figure 4H:
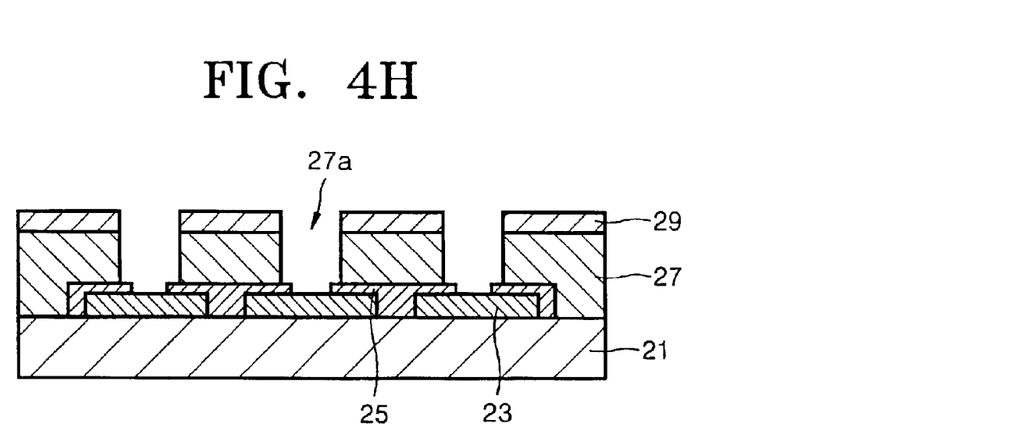

FIG. 4H illustrates the step of removing the amorphous silicon, which is the resistive layer 25. The amorphous silicon is patterned by a photo process, as was the gate insulating layer 27. Here, the dry etching process is used. A step is formed in performing the pattering so as not to generate a short on the cathode electrodes 23.

Types of the dry etching processes include a physical ion etching method which uses sputtering by ion impact, a chemical etching method which uses the chemical action of reactants generated in plasma, or a physical and chemical etching method which uses the chemical action performed by ions, electrons, and photons. The present invention uses the ion etching method. Here, ions, neutral atoms, or neutral molecules having a large amount of energy are made to collide against an etching surface, i.e., the chrome of the gate electrode 29. Therefore, the chrome atoms overcome the binding energy, thereby being removed from the surface of the gate electrode 29, which is called sputtering. As a result, the gate electrode 29 is etched by sputtering.

Figure 4I:
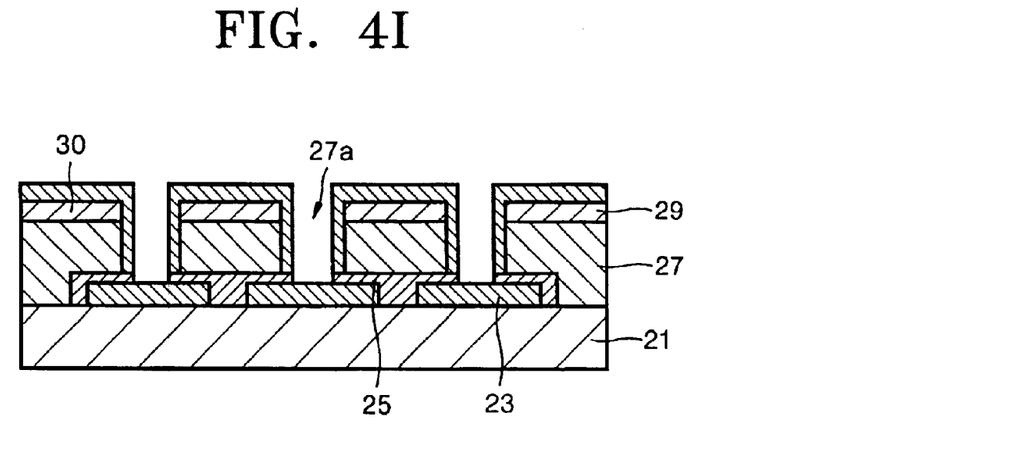

FIG. 4I illustrates the step for coating the photoresist 30 on the gate electrodes 29, and the sidewalls of the gate electrodes 29 that face the well in a triode. Referring to FIG. 4I, the photoresist 30 is removed to form gate wells 27a by coating the photoresist 30 on the triode and drying, exposing, and developing the photoresist 30.

Figure 4J:
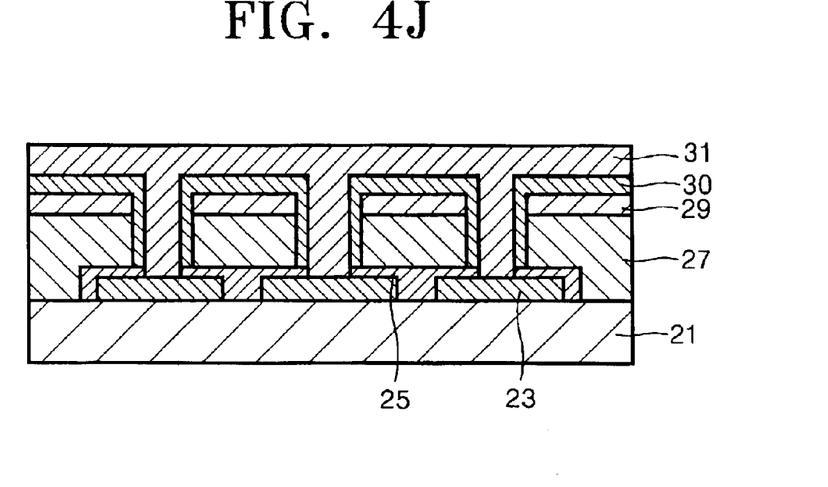

Next, the composite 31 for paste according to the present invention is printed on the photoresist 30 on the cathode electrodes 23 and dried at a temperature over 50° C. as shown in FIG. 4J.

Figure 4K:
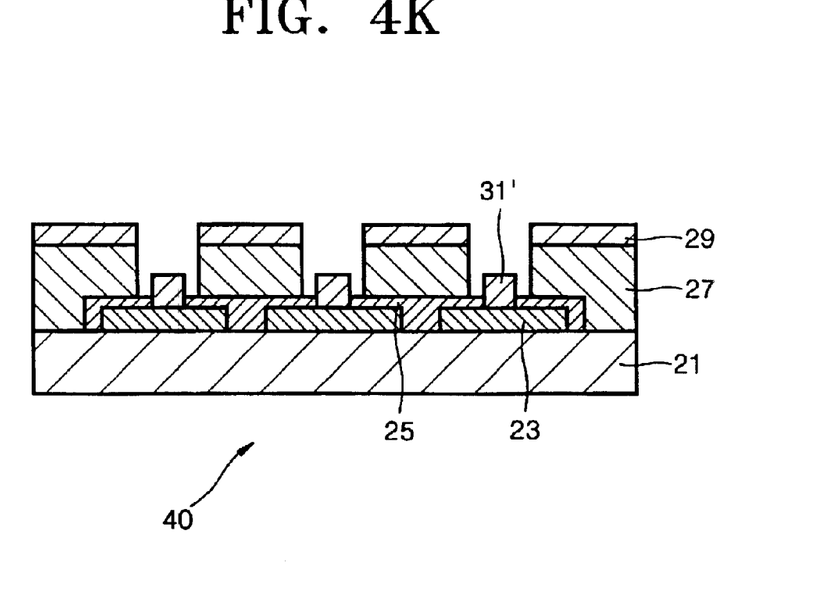

As the photoresist 30 is dissolved using acetone, a portion of the composite 31 for paste is lifted off according to the removal of the photoresist. The remaining composite 31 for paste is attached on the cathode electrodes 23, which are exposed through the wells 27a, on the substrate 21 for forming the electron emitting tips 31'.

An example of the composite for paste according to the embodiment of the present invention is formed by the steps of: dispersing 15 g of CNTs, or 10 g of the CNT and 5 g of graphite in 10 ml of distillate; mixing 25 g (n=3.4) of alkali metal silicate with the distillate including the CNTs or the CNTs and the graphite; and adding 1 part by weight of ammonium hydroxide ($NH_4OH$) to the mixture. Therefore, a composite for paste with the pH of 13 is produced for producing the electron emitting device.

Figure 5:
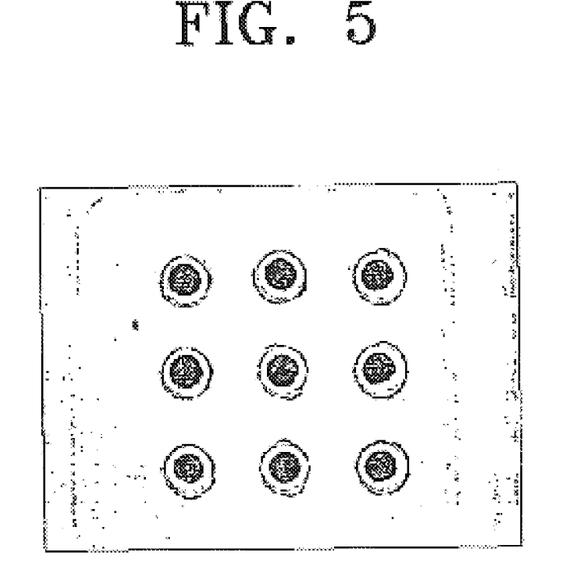
FIG. 5 is a front view showing the electron gun using an example of an electron emitting device according to the embodiment of the present invention.

FIG. 5 is a front view showing a triode electron gun using an example of the composite for paste according to the embodiment of the present invention.

Figure 6:
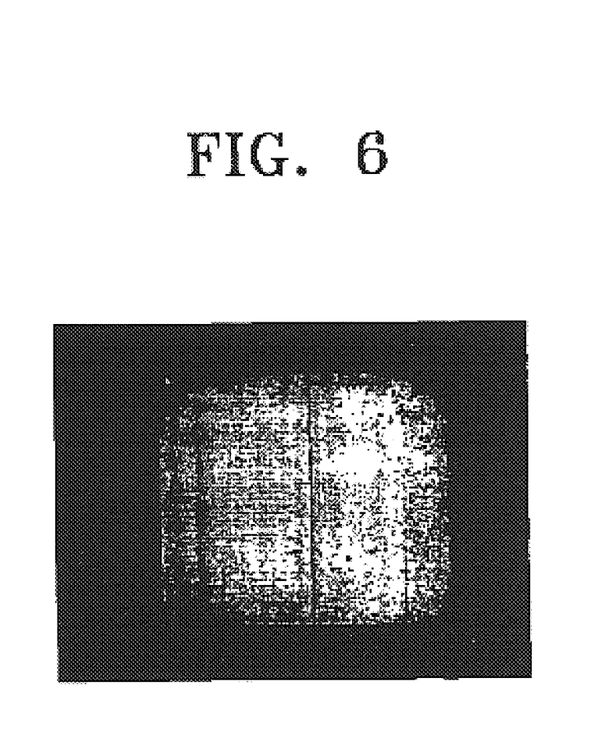
FIG. 6 illustrates an electron emitted image represented by the electron gun shown in FIG. 5 according to the example of the embodiment of the present invention.
Figure 7:
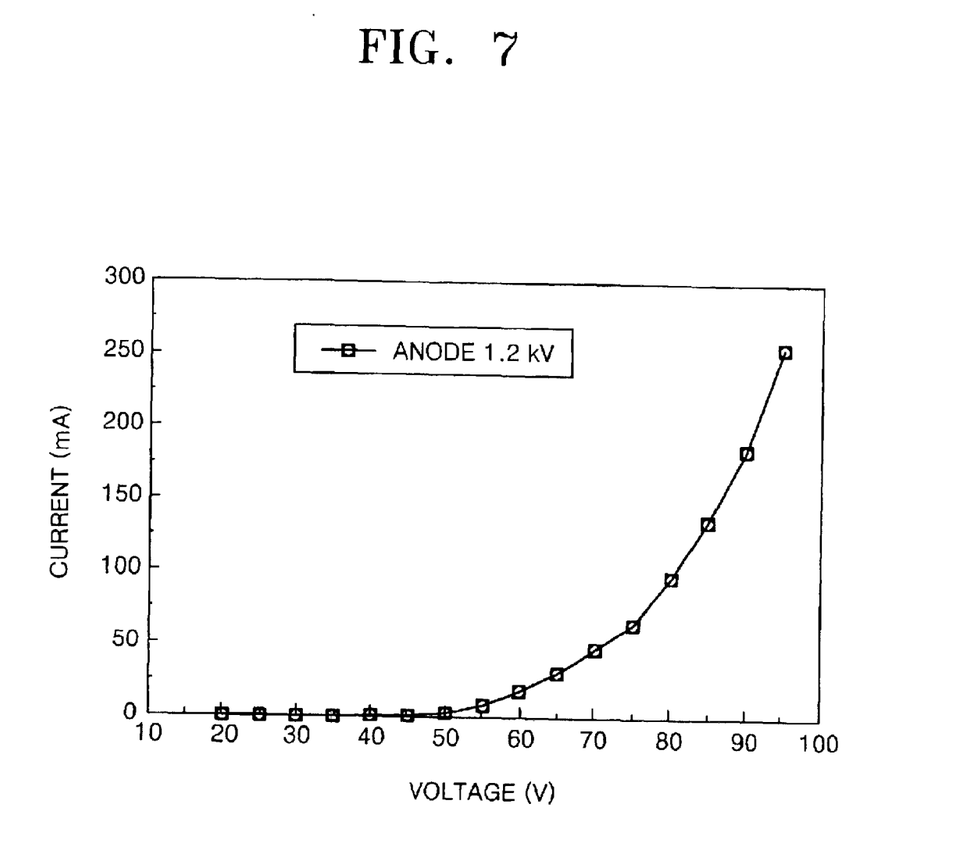
FIG. 7 is a graph showing a current emitted from the electron gun shown in FIG. 5 according to the example of the embodiment of the present invention, while applying a voltage of 1.2 kV to a fluorescent screen and varying a voltage applied to a gate electrode.

FIG. 6 illustrates a fluorescent substance, which emits light by the electron gun. FIG. 7 is a graph showing a current emitted from a fluorescent display device having the electron gun, while applying a voltage of 1.2 kV to a fluorescent screen and varying a voltage applied to the gate electrodes.

Referring to FIG. 5, photoresist is coated on the triode as shown in FIG. 4E for a thickness of 4 to 5 micrometers. The photoresist is exposed and processed so as to remain on regions other than the indium-tin-oxide layer, and the prepared composite for paste is printed. After drying the composite for paste at a temperature of 60° C. for 3 minutes, the triode is soaked in an acetone solution for removing the photoresist, and the CNTs and alkali metal silicate thereon. Therefore, the composite for paste between the indium-tin-oxide layers on the substrate remains, thereby forming the electron gun having the electron emitting devices.

In the electron gun of FIG. 5, nine electron emitting devices are formed in one pixel. The composite for paste according to the embodiment of the present invention is formed at the centers of the electron emitting devices while being surrounded by amorphous silicon. Gate chrome is arranged around the pixel so as to form gate electrodes.

FIG. 6 shows the image of the fluorescent substance, which emits electrons by using the electron emitting devices shown in FIG. 5. Here, the gate voltage is 80 V, and the anode voltage is 1.2 kV.

FIG. 7 is a graph measuring the current emitted from the electron gun in the fluorescent display device using the electron emitting devices shown in FIG. 5, where the anode voltage is fixed at 1.2 kV and the gate voltage is varied. As shown in FIG. 7, the current flows when the gate voltage is 50 V, thereby starting the emission of the electrons from the electron emitting device at a voltage of 50 V.

Figure 8:
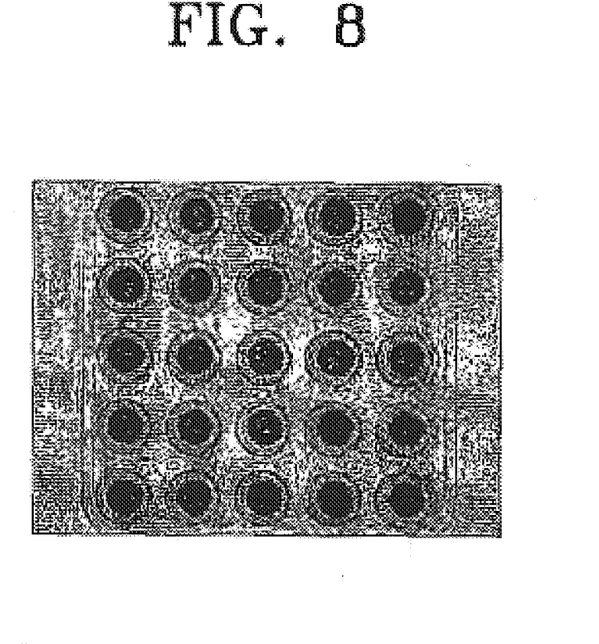
FIG. 8 is a front view showing an electron gun using the electron emitting devices according to another example of the embodiment of the present invention.

An electron gun shown in FIG. 8 is the same as the electron gun shown in FIG. 5 in terms of its structure and elements, however, the number of electron emitting devices arranged in one pixel is increased to 25 while reducing the size of the hole to 5 micrometers.

Figure 9:
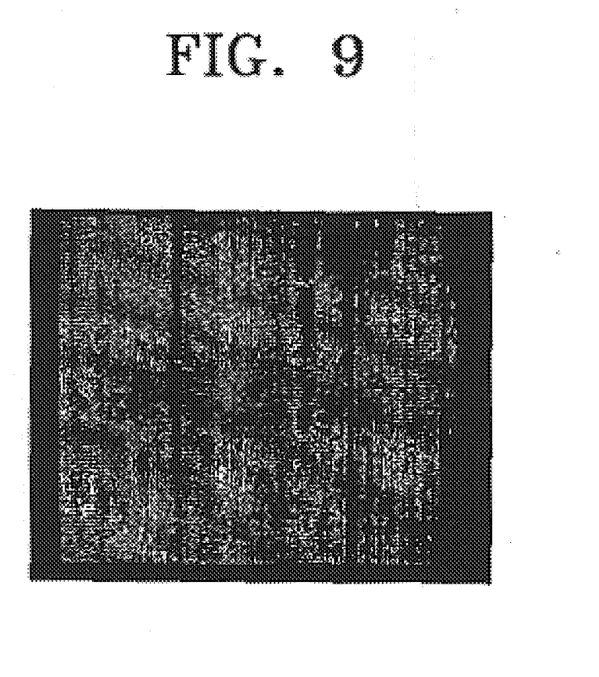
FIG. 9 illustrates an electron emitted image represented by the electron gun shown in FIG. 8 according to another example of the embodiment of the present invention.

FIG. 9 is a photograph showing the electron emitting image of the electron gun shown in FIG. 8. Here, the image of FIG. 9 is brighter than that of FIG. 6, which represents the improvement in light emitting uniformity.

Figure 10:
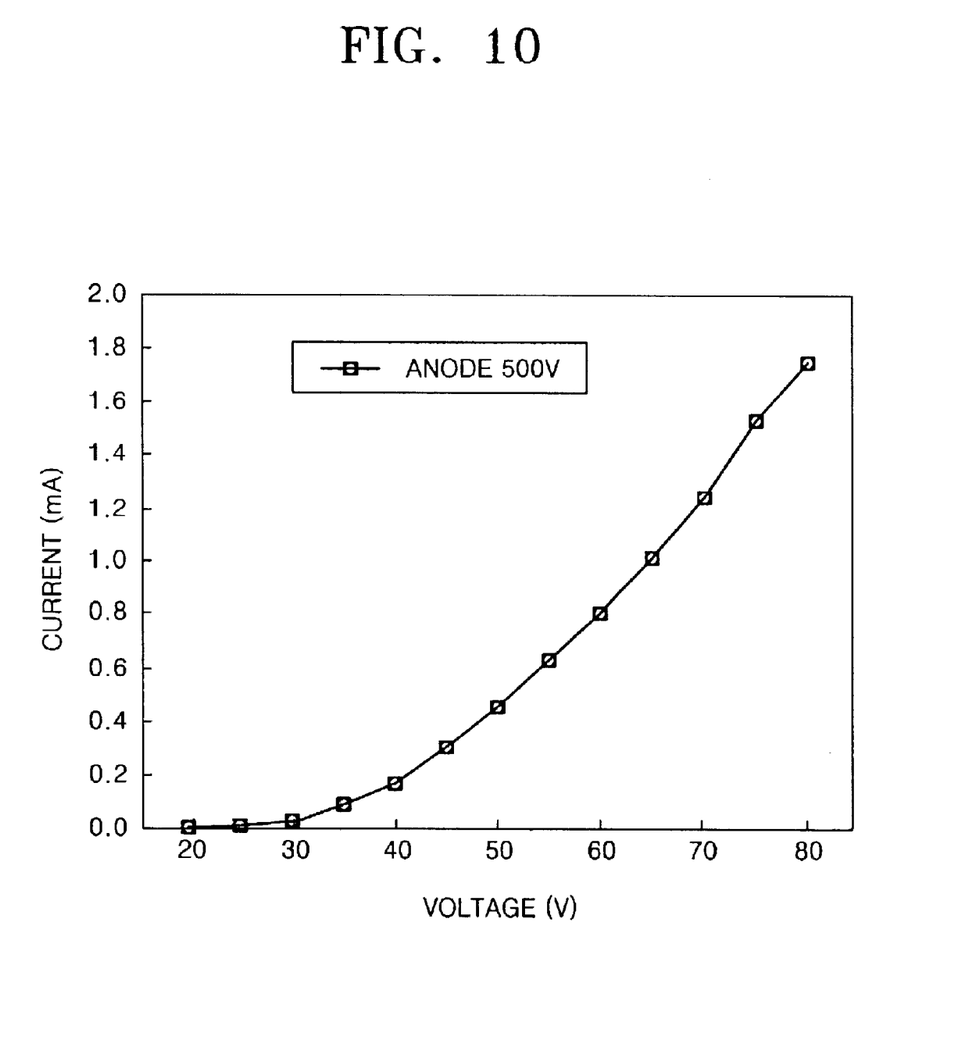
FIG. 10 is a graph showing a current emitted from the electron gun shown in FIG. 8 according to another example of the embodiment of the present invention, while applying a voltage of 500 V to a fluorescent screen and varying a voltage applied to a gate electrode.

FIG. 10 is a graph showing a relationship between the voltage and the current in the electron emitting device. By comparing the graph of FIG. 10 with the graph of FIG. 7, the electron emitting voltage is reduced from 45 V into 25 V when the anode voltage is 500 V, thereby representing an improvement in the performance of the electron emitting device.

Other than the example shown in FIG. 5, a composite for paste according to another example is formed by the steps of: dispersing 12 g of CNTs and 2 g of graphite in 100 ml of distillate; adding 1 part by weight of sodium hydroxide to the solution for maintaining the pH at 13; and mixing 30 g of alkali metal silicate. The composite according to another example is processed by the production process of the electron emitting device according to the present invention, so that the electron emitting device is produced.

A composite for paste and a method for producing an electron emitting device using the same according to the embodiment of the present invention provide an electron emitting device having excellent stability and durability, which can uniformly emit electrons from a large area. Accordingly, an apparatus using the electron emitting device produced by the method according to the embodiment of the present invention does not require a high temperature thermal process, and has improved overall performance due to the stability and durability of the electron emitting device.

While this invention has been particularly shown and described with reference to preferred embodiments thereof, the preferred embodiments described above are merely illustrative and are not intended to limit the scope of the invention.

For example, it will be appreciated by one skilled in the art that a material having a property of being hardened and adhered at a low temperature is used instead of alkali metal silicate for producing a triode electron gun. Therefore, it is apparent that variations and modifications by those skilled in the art can be effected within the spirit and scope of the present invention defined in the appended claims.

As above-described, the merits of a composite for paste, an electron emitting device using the same, and a manufacturing method thereof are excellent stability and durability, and uniform emission of electrons from a large area, thereby improving the overall performance of an apparatus using the electron emitting device.

What is claimed is:

1. A composite for paste, including 5 to 40 parts by weight of carbon nanotubes (CNTs), 5 to 50 parts by weight of alkali metal silicate, and 1 to 20 parts by weight of binder.

2. The composite of claim 1, wherein 5 to 40 parts by weight of graphite is further included.

3. The composite of claim 1, wherein 10 to 40 parts by weight of water is further included.

4. The composite of claim 1, wherein 1 to 6 parts by weight of additive is further included, so that the hydrogen-ion concentration (pH) of the composite is from 10 to 14.

5. The composite of claim 3, wherein 1 to 6 parts by weight of additive is further included so that the pH of the composite is from 10 to 14.

6. The composite of claim 4, wherein the additive is one of potassium hydroxide, sodium hydroxide, and ammonium hydroxide aqueous solution.

7. The composite of claim 5, wherein the additive is one of potassium hydroxide, sodium hydroxide, and ammonium hydroxide aqueous solution.

8. The composite of claim 1, wherein the size of the CNTs is from 10 nanometers to 10 micrometers.

9. The composite of claim 1, wherein the alkali metal silicate is $Na_2O$-$nSiO_2$ or $K_2O$-$nSiO_2$, and n is from 2.2 to 3.9.

10. The composite of claim 2, wherein the size of the graphite is from 100 nanometers to 5 micrometers.

11. The composite of claim 1, wherein the binder is at least one material from an organic carboxylic acid group, an organic sulfonic acid group, an ester group, an inorganic acid group or a salt group thereof, a hydracid salt, and an organic acid composition group.

12. The composite of claim 1, wherein the binder is formed by mixing at least two materials from the organic carboxylic acid group, the organic sulfonic acid group, the ester group, the inorganic acid group or the salt group thereof, hydracid salt, and the organic acid composition group.

13. An electron emitting device including a substrate, cathode electrodes patterned on the substrate in a predetermined shape, a resistive layer stacked to encompass the cathode electrodes, thereby exposing portions of the cathode electrodes, a gate insulating layer patterned on the resistive layer in a predetermined shape to arrange wells in which the exposed cathode electrodes are located, and gate electrodes arranged on the gate insulating layer, the electron emitting device comprising electron emitting tips formed of a composite for paste including 5 to 40 parts by weight of carbon nanotubes, 5 to 50 parts by weight of alkali metal silicate, and 1 to 20 parts by weight of binder.

14. The electron emitting device of claim 13, wherein the composite for paste further includes 5 to 40 parts by weight of graphite.

15. The electron emitting device of claim 13, wherein the composite for paste further includes 10 to 40 parts by weight of water.

16. The electron emitting device of claim 13, wherein the composite for paste further includes 1 to 6 parts by weight of additive to control the pH of the composite to be from 10 to 14.

17. The electron emitting device of claim 15, wherein the composite for paste further includes 1 to 6 parts by weight of additive to control the pH of the composite to be from 10 to 14.

18. The electron emitting device of claim 16, wherein the additive is one of potassium hydroxide, sodium hydroxide, and ammonium hydroxide aqueous solution.

19. The electron emitting device of claim 17, wherein the additive is one of potassium hydroxide, sodium hydroxide, and ammonium hydroxide aqueous solution.

20. The electron emitting device of claim 13, wherein the size of the carbon nanotube is from 10 nanometers to 10 micrometers.

21. The electron emitting device of claim 13, wherein the alkali metal silicate is $Na_2O$-$nSiO_2$ or $K_2O$-$nSiO_2$, and n is from 2.2 to 3.9.

22. The electron emitting device of claim 14, wherein the size of the graphite is from 100 nanometers to 5 micrometers.

23. The electron emitting device of claim 13, wherein the binder is at least one material from an organic carboxylic acid group, an organic sulfonic acid group, an ester group, an inorganic acid group or a salt group thereof, a hydracid salt, and an organic acid composition group.

24. The electron emitting device of claim 13, wherein the binder is formed by mixing at least two materials from the organic carboxylic acid group, the organic sulfonic acid group, the ester group, the inorganic acid group or the salt group thereof, the hydracid salt, and the organic acid composition group.

25. The electron emitting device of claim 13, wherein the cathode electrode is a conductive transparent material.

26. The electron emitting device of claim 25, wherein the cathode electrode is indium-tin-oxide.

27. The electron emitting device of claim 13, wherein the resistive layer is amorphous silicon.

28. The electron emitting device of claim 13, wherein the gate insulating layer is silicon dioxide.

29. The electron emitting device of claim 13, wherein the gate electrode is chrome.

\* \* \* \* \*